United States Patent [19]

Moore

[11] Patent Number: 6,003,643
[45] Date of Patent: Dec. 21, 1999

[54] AXIAL VIBRATION DAMPING MEANS IN A BRAKE ACTUATOR

[75] Inventor: Roland S. Moore, Taylors, S.C.

[73] Assignee: Westinghouse Air Brake Company, Wilmerding, Pa.

[21] Appl. No.: 09/005,452

[22] Filed: Jan. 12, 1998

[51] Int. Cl.[6] .................................................. F16D 65/52
[52] U.S. Cl. .......................... 188/197; 188/198; 188/202
[58] Field of Search ..................... 188/197, 198, 188/199, 200, 201, 202, 203; 384/611, 620

[56] References Cited

U.S. PATENT DOCUMENTS

| | | |
|---|---|---|
| 2,530,323 | 11/1950 | Boyd . |
| 3,101,814 | 8/1963 | Newell . |
| 3,231,926 | 2/1966 | Stollman . |
| 3,593,827 | 7/1971 | Sander ..................................... 188/196 |
| 4,585,097 | 4/1986 | Severinsson ............................ 188/196 |
| 4,619,348 | 10/1986 | Smith ..................................... 188/196 |

FOREIGN PATENT DOCUMENTS 1192338  5/1970  United Kingdom ................... 188/203

*Primary Examiner*—Robert J. Oberleitner
*Assistant Examiner*—Sarah M. Sawhill
*Attorney, Agent, or Firm*—James Ray & Associates

[57] ABSTRACT

A brake actuator and slack adjuster subjected to axial vibration includes a slack adjusting mechanism circumferentially engaging a brake actuating mechanism. A circumferential elastomer bushing is disposed about the brake actuating mechanism for damping axial vibrations experienced by the slack adjuster. One washer has a recess sized to receive and seat one end of the bushing while a shim washer is located at the other end of the bushing and against a bearing race of the slack adjuster.

6 Claims, 2 Drawing Sheets

AXIAL VIBRATION DAMPING MEANS IN A BRAKE ACTUATOR

FIELD OF THE INVENTION

The present invention relates, in general, to fluid brake actuators for use on railway and similar type vehicles and, more particularly, this invention relates to a means for damping axial vibrations experienced by slack adjusters in brake actuators.

BACKGROUND OF THE INVENTION

As is well known in the railway art, brake actuators in railroad cars receive vibrations from the wheels of the cars and from the railroad tracks that the wheels travel on. Certain types of slack adjusters currently employed in brake actuators on passenger railway vehicles use a circumferential solid steel bushing located in front of other components of the slack adjuster to hold the components in place about the mechanism of the brake actuator. In addition, a wave washer is located between the steel bushing and a bearing race of the slack adjuster for absorbing axial vibrations received by the slack adjuster. The wave washer, however, is not an effective absorber and dissipater of the energy of axial vibrations, as it has a history of breaking apart under the axial forces generated by these vibrations.

Axial vibrations can also break ball bearings in the slack adjuster held in place between opposed bearing races. Bits and pieces of the bearings and wave washer are thus found in the slack adjuster and the brake actuator mechanisms, which bits and pieces can cause slack adjuster and brake actuator failure.

OBJECTS OF THE INVENTION

The primary objective of the present invention is to dissipate the energy of axial vibrations received by a slack adjuster in a brake actuator. This objective is obtained by replacing the above steel bushing and wave washer with an elastomer bushing to receive and dissipate such energy.

A corollary objective of the invention is to prevent damage to slack adjuster components in a brake actuator caused by axial vibrations.

These and various other objectives and advantages of the present invention will become more readily apparent to those persons skilled in the railway braking art from the following more detailed description of the invention, particularly, when such description is taken in conjunction with the attached drawing Figures and the appended claims.

BRIEF DESCRIPTION OF THE INVENTION

The present invention replaces the wave washer and steel bushing with an elastomer bushing and two retaining washers, one located on each side of the elastomer bushing. The elastomer bushing is effective in dissipating the energy of the axial motion of vibration to the atmosphere in the form of heat so that the axial motion is damped, i.e., stopped. This alleviates wear and damage to slack adjuster components that would otherwise occur with axial vibration.

BRIEF DESCRIPTION OF THE DRAWINGS

The invention, along with its objectives and advantages, will be better understood from consideration of the following detailed description and the accompanying drawings in which.

PREFERRED EMBODIMENT OF THE INVENTION

Figure 1:
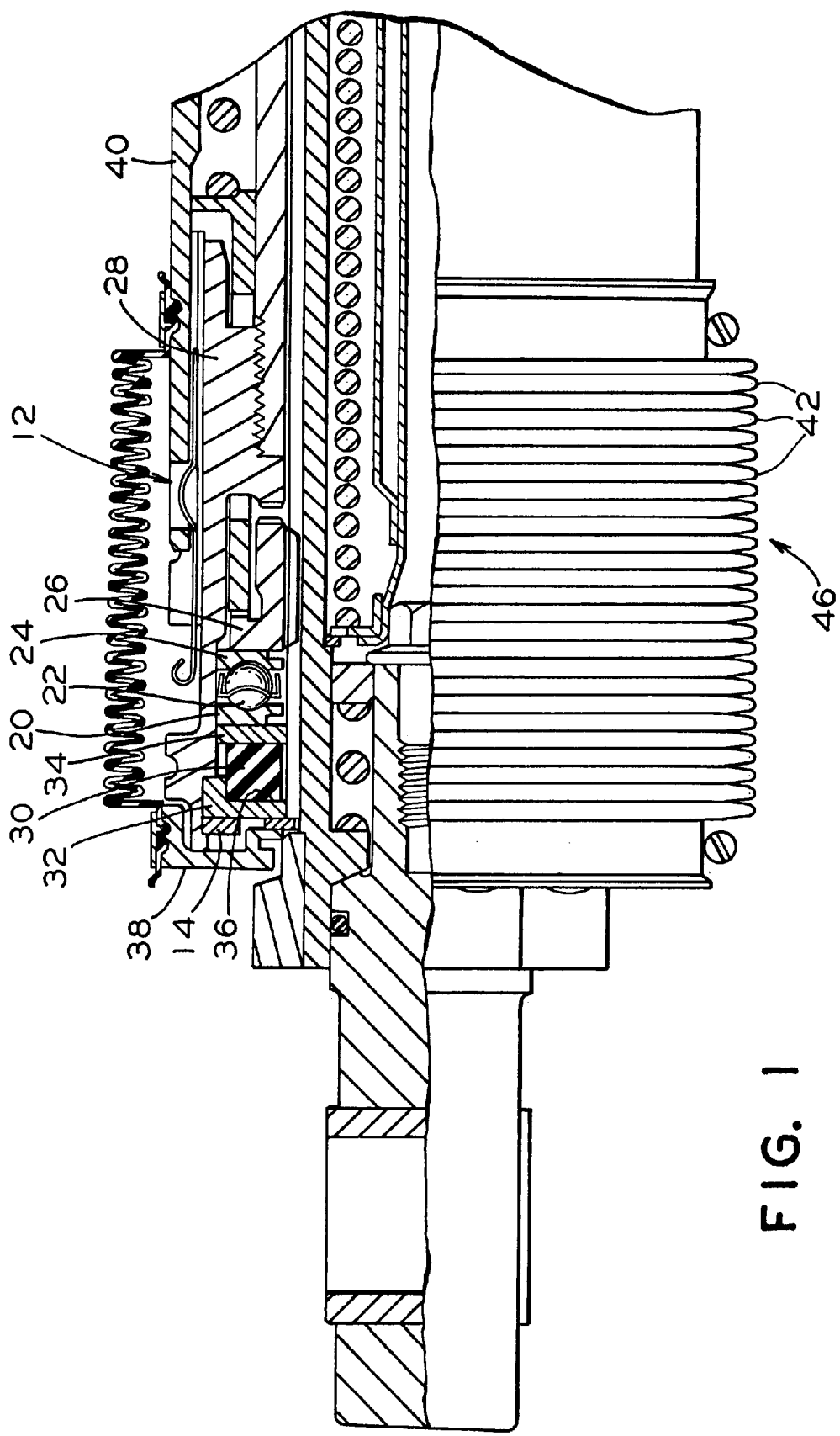
FIG. 1 is a longitudinal view, in partial section and elevation, of a brake actuator and slack adjuster provided with the elastomer damping bushing of the invention.

Prior to proceeding to a more detailed description of the present invention, it should be noted that, for the sake of clarity, identical components, having identical functions, have been identified with identical reference numerals in the two views of the drawings.

Figure 2:
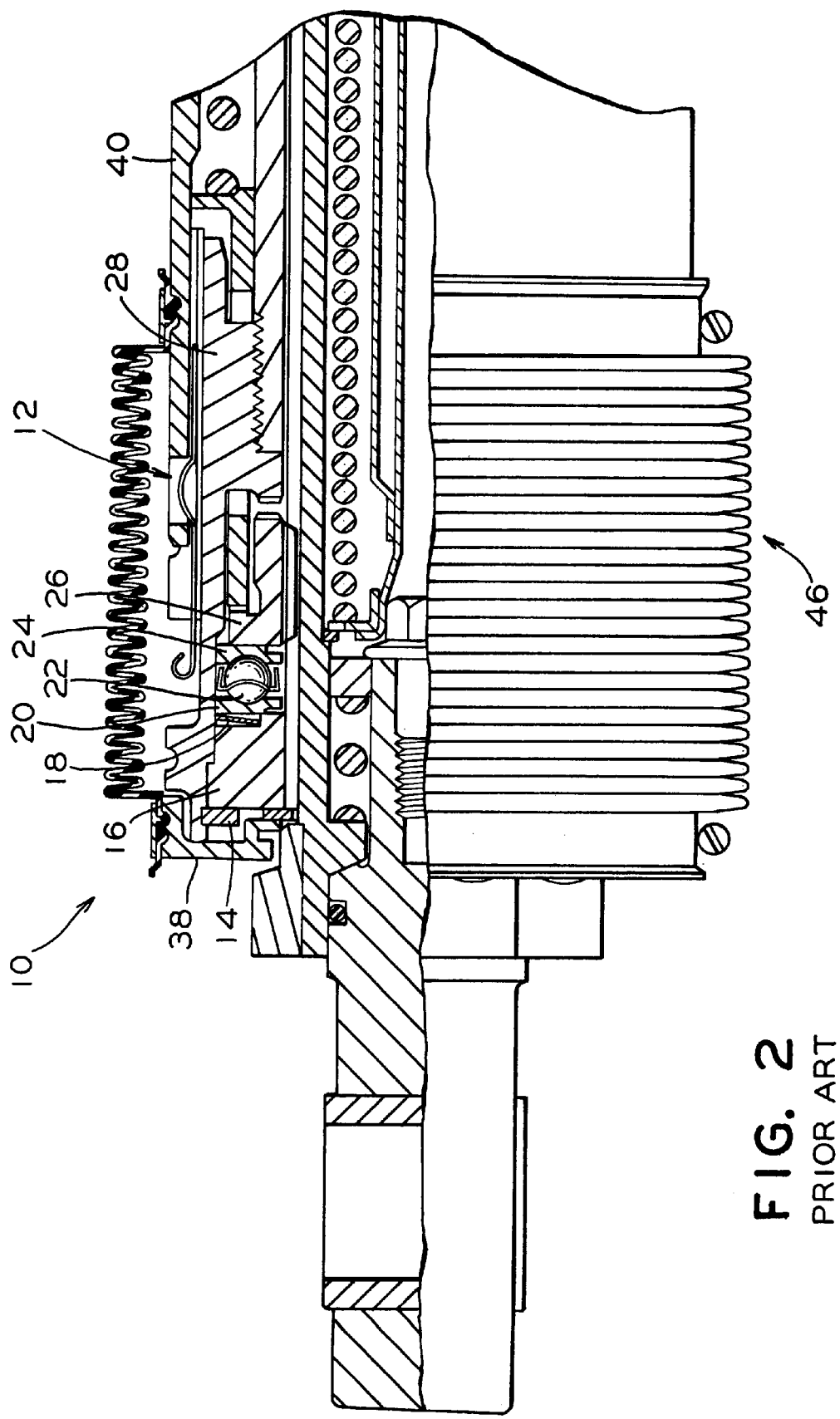
FIG. 2 is a longitudinal view, in partial section and elevation, of the above prior art brake actuator and slack adjuster having the solid steel bushing and wave washer.

Referring now to FIG. 2 of the drawings, a currently used brake actuator 10 having a slack adjuster mechanism 12 is shown in partial longitudinal section. Components of the slack adjuster include a circumferential ring 14 axially retaining a solid steel circumferential bushing 16 and a wave washer 18 disposed in place against a first circumferential bearing race 20. A plurality of ball bearings 22, extending circumferentially about inner components of the brake actuator mechanism, are held in place between the first bearing race 20 and a second bearing race 24. The second bearing race 24 abuts against an adjuster nut 26 located between the second bearing race 24 and a toothed circumferential sleeve 28. Sleeve 28 encloses the previous components and secures retaining ring 14 in place in front of solid steel bushing 16.

The above discussed, axial vibrations have broken wave washers 18 and ball bearings 22, and have damaged, in various degrees, steel bushings 16, retaining rings 14, bearing races 20 and 24, adjuster nuts 26 and sleeves 28. Such damaged slack adjuster components render the brake actuators unreliable in performing the function of applying car brakes. What is therefore needed is a means to absorb and dissipate the energy of the axial vibrations received by the slack adjuster such that the components of the slack adjuster are not damaged.

FIG. 1 of the subject drawings shows such a means in the form of an elastomer bushing 30 located between two washers 32 and 34. The elastomer bushing 30 and washers 32 and 34 replace the solid steel bushing 16 and wave washer 18. Washer 32 is shown provided with a hollow recess portion 36 that receives and seats one end of the elastomer bushing 30, while washer 34 seats against the other end of the elastomer bushing 30 and serves as a shim means located between bearing race 20 and the elastomer bushing 30. The elastomer bushing 30 is thereby axially held in place by washers 32 and 34 and retaining ring 14, and circumferentially secured by sleeve 28.

Axial or longitudinal vibrations reaching the slack adjuster 12 are absorbed and damped by such elastomer bushing 30, the elastomer bushing 30 being worked by the vibrations in a manner that heats the elastomer bushing 30. This heat is radiated to the atmosphere, and thereby dissipates the energy of the vibration, i.e., the bushing compresses and relaxes at the frequency of the axial vibrations. This cyclic compressing and relaxing of the bushing generates heat in the bushing, which dissipates to the atmosphere in and around the slack adjuster.

A suitable material for elastomer bushing 30 is a urethane compound, though other materials having damping capabilities can also be used effectively.

The figures illustrated in the drawings show, in addition, a flexible dust boot 46 appropriately attached and sealed to and between a forward wall portion 38 and a rear sleeve 40 of brake actuator 10. As the name indicates, boot 46 encloses the components of slack adjuster 12 and thereby maintains a dust-free atmosphere for the components of the slack adjuster 12 while simultaneously allowing forward wall portion 38 to move relative to rear sleeve 40, which is fixed. The flexible dust boot 46 has folded wall portions 42 that permit such relative movement of forward wall portion 38 and sleeve 40 while maintaining the dust-free environment.

While the presently preferred embodiment for carrying out the instant invention has been set forth in detail above, those persons skilled in the brake actuator art to which this invention pertains will recognize various alternative ways of practicing the invention without departing from the spirit and scope of the patent claims appended hereto.

What is claimed is:

1. An improvement to a slack adjuster mechanism for a brake actuator unit, said slack adjuster mechanism being circumferentially engaged about said brake actuator unit with (i) first and second bearing races extending circumferentially about inner components of said brake actuator unit; (ii) a plurality of ball bearings held circumferentially in place about said inner components by and between said bearing races; (iii) a retaining ring circumferentially disposed about said inner components apart from said first bearing race; (iv) a toothed sleeve, to which said retaining ring secures, circumferentially enclosing said bearing races, said ball bearings and said retaining ring; and (iv) an adjuster nut circumferentially disposed about said inner components between said second bearing race and said toothed sleeve; said improvement comprising:

(a) a first washer circumferentially disposed about said inner components and enclosed by said toothed sleeve, said first washer abutting against said retaining ring;
   (b) a second washer circumferentially disposed about said inner components and enclosed by said toothed sleeve, said second washer abutting against said first bearing race;
   (c) an elastomer bushing circumferentially disposed about said inner components and enclosed by said toothed sleeve, said elastomer bushing axially held in place between said first and second washers for damping axial vibrations experienced by said slack adjuster mechanism; and
   (d) a dust boot having folded wall portions circumferentially enclosing said elastomer bushing and said washers and allowing relative movement of housing portions of said brake actuator unit.

2. The improved slack adjuster mechanism of claim 1 wherein said first washer defines a recess sized to receive and seat one end of said elastomer bushing.

3. The improved slack adjuster mechanism of claim 2 wherein said second washer serves as a shim between said first bearing race and an opposite end of said elastomer bushing.

4. A brake actuator and slack adjuster mechanism for a railway vehicle, said brake actuator and slack adjustor mechanism comprising:

(a) first and second bearing races extending circumferentially about inner components of said mechanism;
   (b) a plurality of ball bearings held circumferentially in place about said inner components by and between said bearing races;
   (e) a retaining ring circumferentially disposed about said inner components apart from said first bearing race;
   (d) a toothed sleeve, to which said retaining ring secures, circumferentially enclosing said bearing races, said ball bearings and said retaining ring;
   (e) an adjuster nut circumferentially disposed about said inner components between said second bearing race and said toothed sleeve;
   (f) a first washer circumferentially disposed about said inner components and enclosed by said toothed sleeve, said first washer abutting against said retaining ring;
   (g) a second washer circumferentially disposed about said inner components and enclosed by said toothed sleeve, said second washer abutting against said first bearing race;
   (h) an elastomer bushing circumferentially disposed about said inner components, said elastomer bushing being enclosed by said toothed sleeve and axially held in place between said first and second washers for maintaining certain components of said mechanism in place and for damping axial vibrations experienced by said mechanism; and
   (i) a dust boot having folded wall portions that circumferentially encloses said elastomer bushing and said washers and allows relative movement of housing portions of said mechanism.

5. The brake actuator and slack adjuster mechanism of claim 4, wherein said first washer has a hollow recess portion for seating one end of said elastomer bushing.

6. The brake actuator and slack adjuster mechanism of claim 5 wherein said second washer serves as a shim that maintains said elastomer bushing in place about said inner components of said mechanism between said first bearing race and an opposite end of said elastomer bushing.

* * * * *